United States Patent [19]

DiMartini et al.

[11] 4,039,323
[45] Aug. 2, 1977

[54] PROCESS FOR THE RECOVERY OF BISMUTH

[75] Inventors: Carl Richard DiMartini, Piscataway; William Lafayette Scott, Lebanon, both of N.J.

[73] Assignee: Asarco Incorporated, New York, N.Y.

[21] Appl. No.: 701,260

[22] Filed: June 30, 1976

Related U.S. Application Data

[63] Continuation-in-part of Ser. No. 673,179, April 2, 1976.

[51] Int. Cl.² ............................................. C22B 37/00
[52] U.S. Cl. ........................................... 75/70; 75/78; 423/94; 423/494
[58] Field of Search ................ 75/70, 78, 63; 423/94, 423/494

[56] References Cited

U.S. PATENT DOCUMENTS

| | | | |
|---|---|---|---|
| 2,056,164 | 10/1936 | Betterton et al. | 75/78 |
| 2,133,327 | 10/1938 | Jollivet | 75/78 |
| 2,204,651 | 6/1940 | Betterton et al. | 75/78 |
| 2,213,197 | 9/1940 | Betterton et al. | 75/78 |

Primary Examiner—M. J. Andrews
Attorney, Agent, or Firm—R. J. Drew; E. J. Schaffer

[57] ABSTRACT

Bismuth is recovered as elemental bismuth or as a Pb-Bi alloy from an air-pervious residue cake of de-bismuthizing dross of concentrated alkaline bismuthide content, by heating the cake in air to the ignition temperature of the cake to ignite the cake, and burning autogenously in a flameless or substantially flameless combustion the thus-ignited cake to oxidize the alkali and a portion of the lead to the exclusion of the bismuth. A powder-like residue, formed by the burning, comprises bismuth, lead, lead oxide and alkali oxide. The lead oxide and alkali oxide of the residue are then selectively dissolved in an oxide-dissolving flux, e.g. molten lead chloride, and the flux containing the lead oxide and alkali oxide is skimmed from the resulting lead bismuthide alloy. The lead of the alloy can, if desired, be separated to recover elemental bismuth, for example, by reacting the Pb-Bi alloy in molten droplet or molten particulate form with $Cl_2$ to form $PbCl_2$, by electrolysis, or by blowing the molten Pb-Bi alloy with air in a cupel to form litharge which is skimmed off.

8 Claims, 6 Drawing Figures

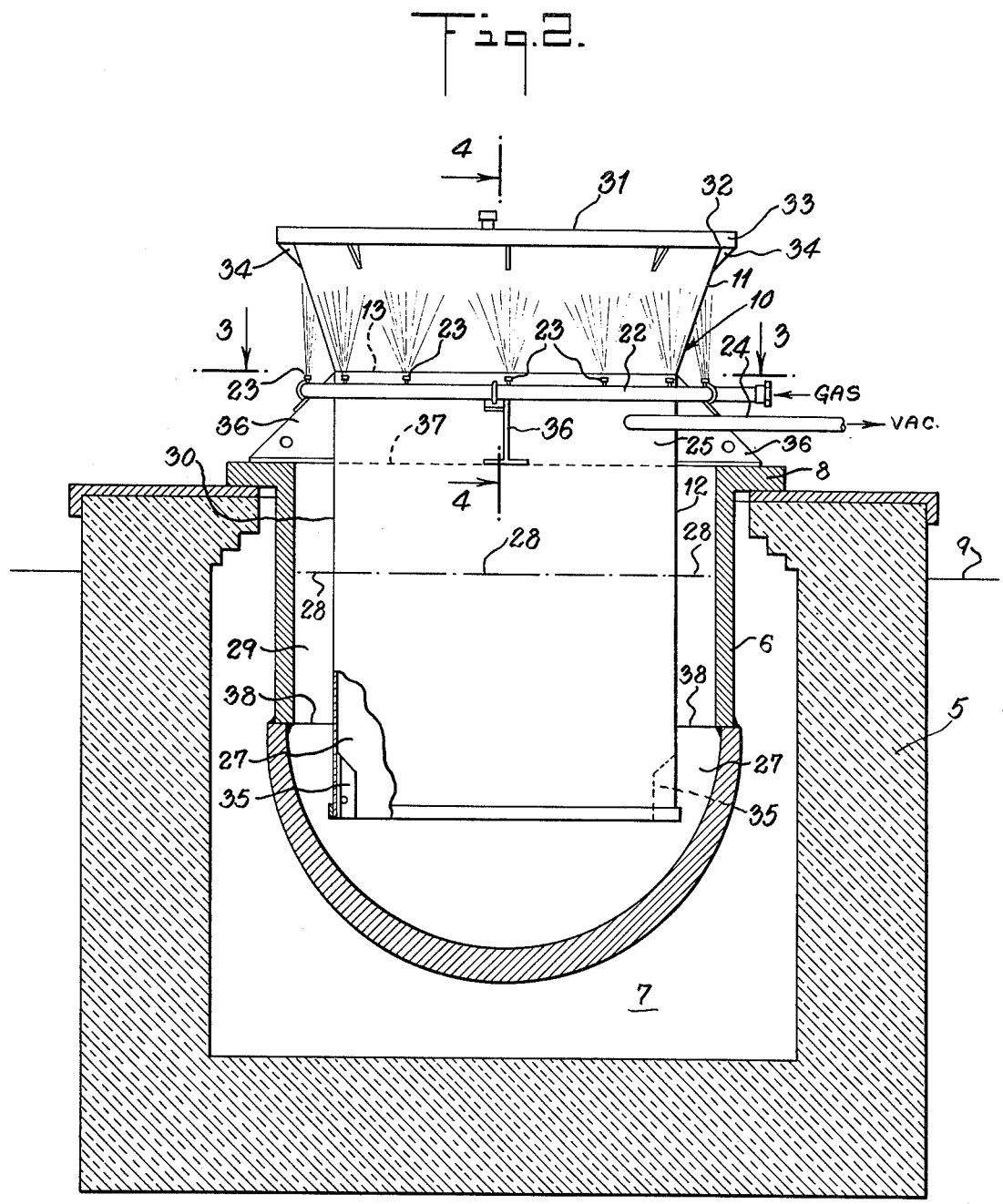

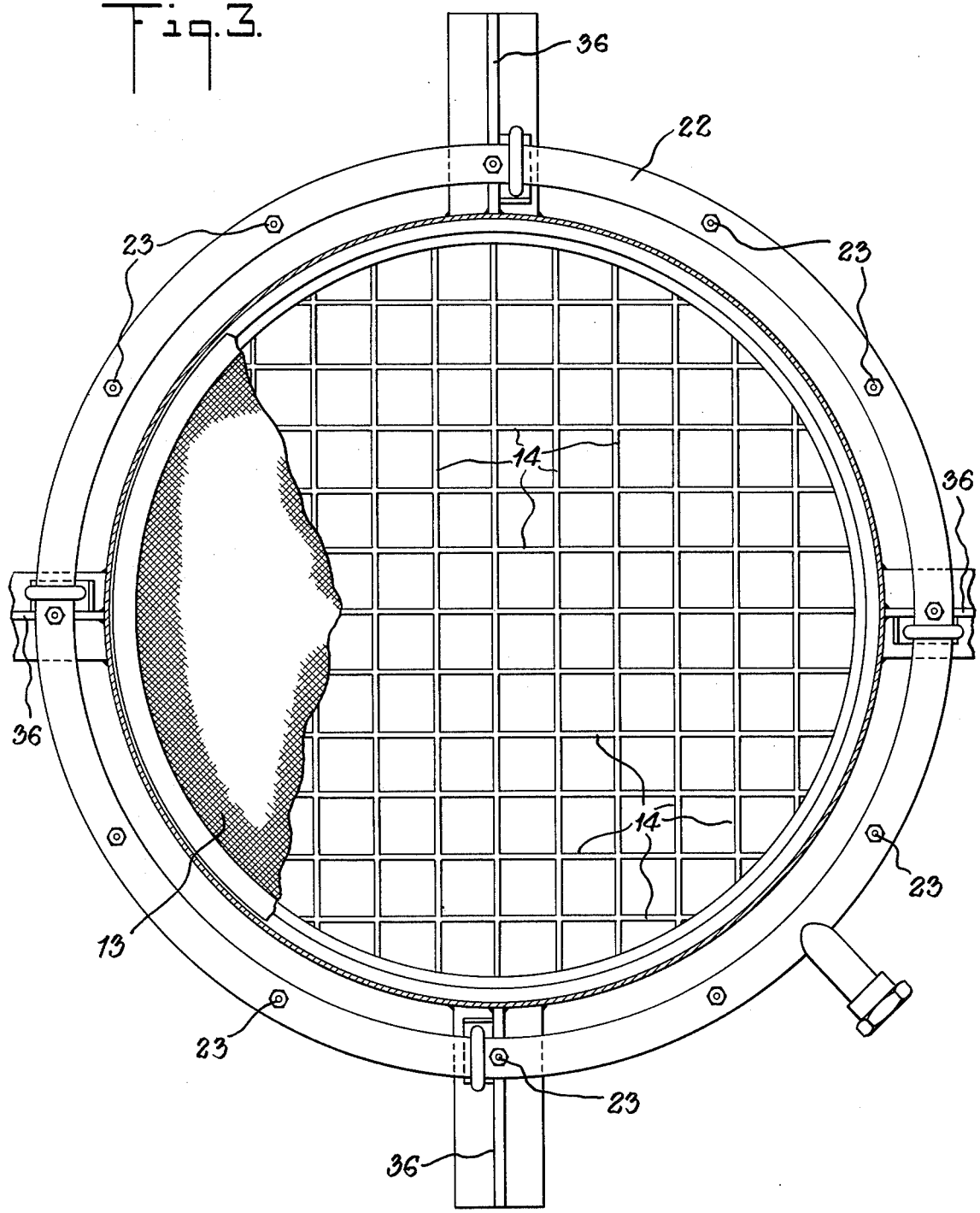

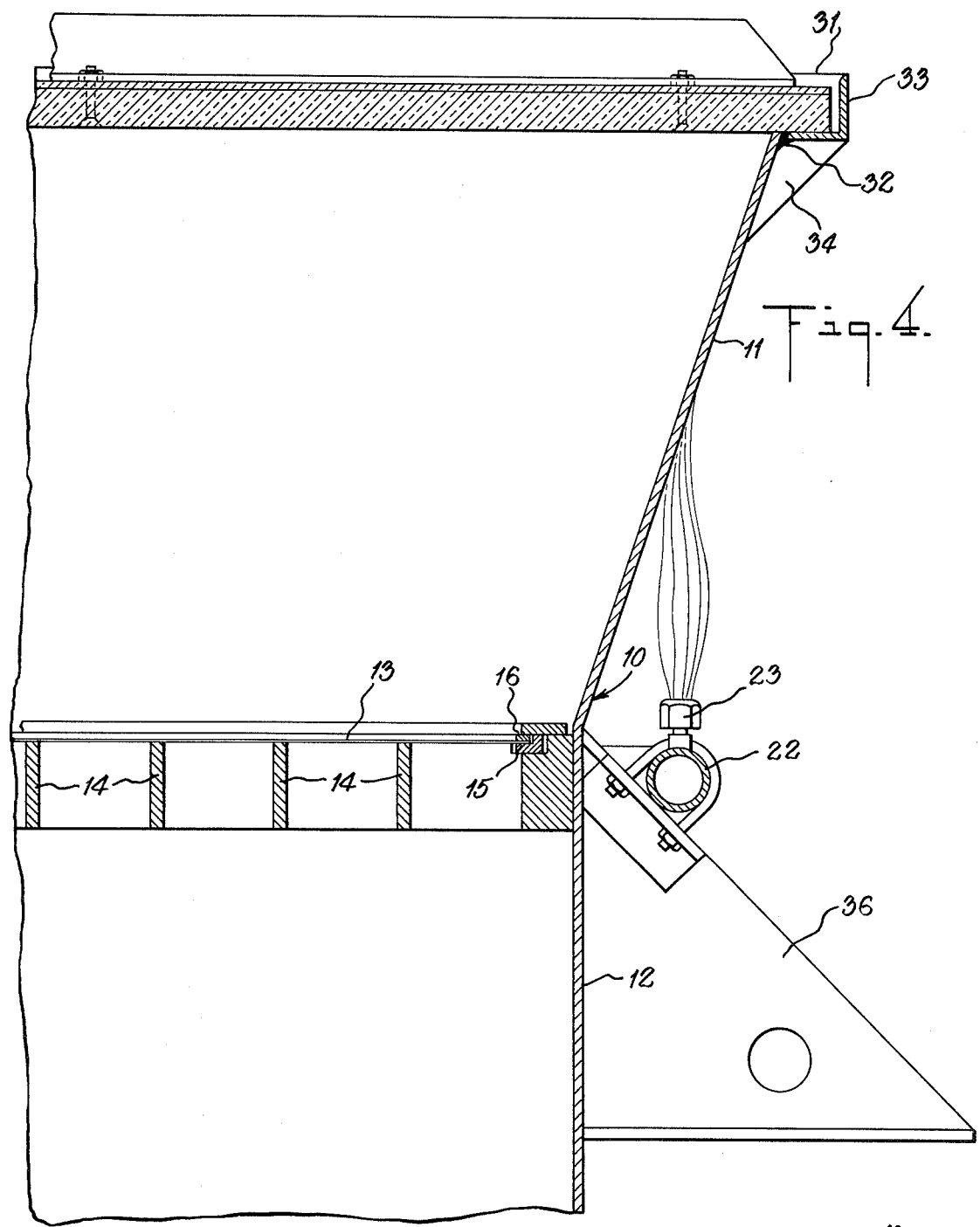
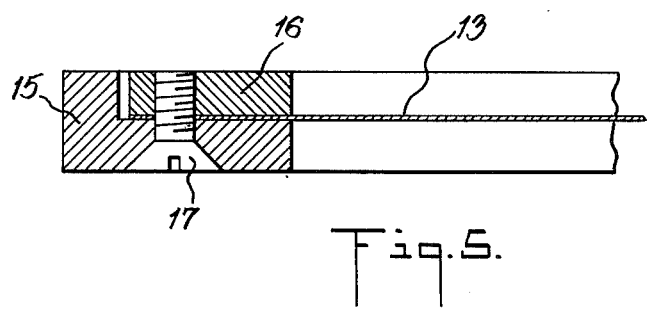
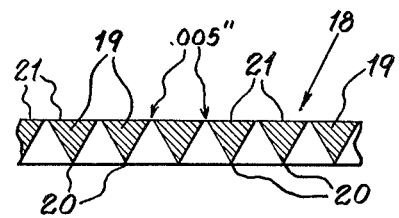

PROCESS FOR THE RECOVERY OF BISMUTH

CROSS REFERENCES TO RELATED APPLICATIONS

This is a continuation-in-part of our co-pending U.S. Patent Application Ser. No. 673,179, filed Apr. 2, 1976.

BACKGROUND OF THE INVENTION

1. Field of the Invention

This invention relates to the recovery of bismuth and more particularly to a new process for the recovery of bismuth as elemental bismuth or as lead-bismuth alloy from an alkaline bismuthide-and lead-containing material.

2. Description of the Prior Art

It is known in the prior art to remove bismuth from lead by treating the molten bath of bismuth-containing lead with appropriate alkaline earth or alkali metal as debismuthizing reagent. The bismuth forms an alkaline bismuthide with the debismuthizing reagent and the alkaline bismuhide forms a dross on the molten bath surface, the dross being referred to in the art as alkaline bismuthide dross or as "debismuthizing" dross. The dross contains an appreciable amount of lead in addition to the alkaline bismuthide. Calcium and magnesium are presently utilized as debismuthizing reagents for removing the bismuth from the lead. Sodium and potassium have also been utilized heretofor as the debismuthizing reagent. The dross is then separated from the lead, for instance by skimming.

In the recovery of the bismuth from the debismuthizing dross, it is important that the alkaline bismuthide be concentrated in the dross in penetration for further refining to obtain pure bismuth. In this regard, it would be highly desirable to at least double the bismuth content of the debismuthizing dross in preparation for further refining. For example, if the debismuthizing dross contained 6% of bismuth as alkaline bismuthide, it is highly desirable to concentrate the bismuthide in the dross so as to increase the bismuth content to 12% or higher.

Heretofor the bismuthide has been concentrated in the debismuthizing dross by either mechanically pressing the dross, or by liquating the dross under a flux. In the pressing of the debismuthizing dross, the dross was pressed to expel molten lead from the bismuthide particles by steel plates by means of hydraulic pressure applied to the plates. Some molten lead is expelled but the pores of the alkaline bismuthide solid mass or cake are soon blocked due to significant physical compression of the bismuthide cake by reason of the mechanical pressing. Consequently, additional lead can not be pressed out of the cake to any considerable extent, and the cake retains considerable molten lead occluded within the bismuthide cake, with molten lead surrounding partially or completely bismuthide particles in the interior of the cake. Further, the interior of the compressed cake is substantially impermeable or non-pervious to air due to the mechanical pressing, and it is necessary the alkaline bismuthide cake be air permeable or pervious for a subsequent bismuth recovery operation in accordance with the present invention. In the liquating method, thd debismuthizing dross is liquated under a flux, usually a chloride flux. Liquating the dross under a flux is costly for the reasons considerable bismuth is diverted back to the lead and the chloride flux is expensive. Further, liquating under a flux presents a problem of disposal of slag, for the reason a salt slag is produced that is usually difficult to dispose of. Moreover, the liquation of the dross under a flux is a high temperature operation, involving temperatures of about 700° C.

SUMMARY OF THE INVENTION

The process of this invention for recovering bismuth from the alkaline bismuthide -and lead-containing material comprises heating a free oxygen-containing gas-permeable, solid mass or masses of the alkaline bismuthide -and lead-containing material, for instance a debismuthizing dross of a concentrated alkaline bismuthide content, in the presence of a free oxygen-containing gas, usually air, to at least the ignition temperature of the gas-permeable, porous solid mass or masses to thereby ignite such gas-permeable mass or masses. The thus-ignited permeable mass is burned autogenously to oxidize the alkali and a portion of the lead to the exclusion or substantial exclusion of the bismuth, to form a particulate residue comprising elemental bismuth, elemental lead, lead oxide and alkali oxide or oxides. The lead oxide and alkali oxide are then selectively dissolved in a flux which is usually an added flux, e.g. $PbCl_2$, but which can conceivably be the lead oxide itself which is formed in situ by the burning, the flux comprising the lead oxide and the alkali oxide or oxides dissolved therein being readily separable from the lead-bismuth mixture or alloy. The flux is then separated from the lead-bismuth alloy. The process herein is characterized by being economical and efficient.

The lead-bismuth alloy produced by this invention has utility for production of solder by alloying with tin, and as low-melting alloy for use in anchoring pipes or pieces to be machined.

When elemental bismuth is the desired product instead of the lead-bismuth alloy, the lead of the alloy is separated from the bismuth, for example, by reacting the Pb-Bi alloy in molten droplet or molten particulate form with $Cl_2$ to form $PbCl_2$, by electrolysis or by blowing the molten Pb-Bi alloy with a free oxygen-containing gas, usually air, in a cupel to form litharge which is skimmed off.

It is critical that the solid mass or masses of the alkaline bismuthide -and lead-containing material, which is the feed or charge material to the bismuth-recovery process herein, the gas-permeable or pervious. The reason for this criticality is that the mass or masses of such bismuthide -and lead-containing material is heated in the process of this invention in the presence of a free oxygen-containing gas, usually air, to at least the ignition temperature of such bismuthide -and lead-containing material to spontaneously ignite the mass or masses of such material, and the ignited mass or masses then burns autogeneously to oxidize the alkali and a portion of the lead to the exclusion or substantial exclusion of the bismuth. The air or other free oxygen-containing gas must be able to diffuse or permeate into the interior of the mass or masses of the bismuthide -and lead-containing material so that the combustion will occur in the interior of such mass or masses to selectively oxidize the alkali and a portion of lead, while the bismuth remains substantially non-oxidized, and the air or other free-oxygen containing gas cannot diffuse into the mass or masses of the bismuthide -and lead-containing material unless such mass or masses are gas-permeable or pervious.

The flux utilizable herein is exemplified by oxide-dissolving fluxes such as lead chloride, alkali metal borate, e.g. sodium meta-borate and potassium meta-borate, alkaline earth metal borate, e.g. calcium borate, and lead oxide formed in situ by burning of the air-pervious mass or residue cake.

The pervious mass or residue cake is usually ignited and burned in the presence of air. However, it could be ignited and burned in the presence o another free oxygen-containing gas, e.g. $O_2$-enriched air.

The gas-permeable mass of concentrated alkaline bismuthide and also containing lead, which is the feed charge material to the ignition and burning steps of the present invention, is prepared in accordance with a preferred embodiment, by a method comprising supplying the material comprising the solid alkaline bismuthide particles and molten lead, for example a debismuthizing dross comprising alkaline bismuthide solid particles and molten lead, onto a heat-resistant screen or sieve of substantial mechanical strength. The screen has openings of such size as to enable the formation and retention thereon of a pervious residue cake comprising particles of the alkaline bismuthide. The material is subjected on the screen to the influence of a partial vacuum provided from the opposite side of the screen from the material, and the molten lead is drawn or sucked through pore channels of the porous residue cake comprising the alkaline bismuthide which is formed on the screen and through the screen openings under the influence of the partial vacuum without any significant physical compression of the residue cake, thereby substantially eliminating or minimizing blockage of the pore channels in the porous residue cake due to collapse and constriction of the pore channel walls. The resulting air-pervious, porous residue cake, which is of relatively high alkaline bismuthide content as compared to that of the debismuthizing dross, is then separated from the screen or sieve.

The blockage of the pore channels in the residue cake of alkaline bismuthide solid particles due to collapse and constriction of the pore channels, which occurred in the prior art mechanical pressing of the debismuthizing dross to expel the molten lead and which is obviated or eliminated by the present invention, is undesirable and disadvantageous due to resulting in a considerable quatity of molten lead being occluded or entrapped within the alkaline bismuthide residue cake. The occluded lead encapsulates the bismuthide particles, renders the bismuthide residue cake impervious or nonpermeable to air, and prevents the satisfactory recovery of elemental bismuth from the residue cake by the recovery process of this invention comprising the heating ignition of the residue cake and the combustion of the residue cake autogeneously in a free oxygen-containing gas, usually air.

In one embodiment, a closed or sealed or substantially closed or sealed chamber is provided on that side of the screen from which the partial vacuum is drawn on the material comprising the alkaline bismuthide and molten lead. The material comprising the alkaline bismuthide and molten lead forms one enclosure barrier or wall of the closed or sealed chamber.

It is critical that a partial vacuum equivalent to at least 15 inches Hg be drawn on the alkaline bismuthide-containing molten lead on the residue cake. The reason for this is that at a partial vacuum much less than 15 inches Hg, the molten lead is not drawn or filtered through the pervious residue cake at a significant, feasible rate. We found there was no criticality in the upper limit of partial vacuum that we drew on the alkaline bismuthide-containing molten lead on the filter, and the molten lead can be drawn through the previous residue cake at the highest partial vacuum that we could attain, which was about 28 inches Hg.

The material comprising the alkaline bismuthide particles and molten lead, such as the debismuthizing dross, is ordinarily at a temperature in the range of about 700° F. to about 1000° F. during the concentrating.

The residue cake is formed or built up on the filter screen or sieve to a thickness sufficient to retain on or in the cake the solid particles of alkaline bismuthide, such particles being small particles of size of typically a few microns. The thickness of the residue cake can vary considerably so long as its thickness is sufficient to retain the solid alkaline bismuthide particles on the cake. For example, a residue cake of about 4 inch thickness on the filter screen separated out the particles of bismuth combined with calcium and magnesium from the molten lead in about 10 minutes with 4000 lbs. of molten debismuthizing dross fed to the screen; whereas an about 8 inch thick cake separated out the particles of bismuth combined with calcium and magnesium in about 60 minutes with 200 lbs of molten debismuthizing dross fed to the screen. The residue cake of sufficient thickness to separate the alkaline bismuthide solid particles from the molten lead by retention of such bismuthide solid particles on or in the cake, is formed on the screen or sieve by supplying the material comprising the alkaline bismuthide and molten lead, e.g. debismuthizing dross, onto the screen, and maintaining or holding such material on the screen under atmospheric pressure and without subjecting this material to the partial vacuum for a brief period, typically in the range of about 1–2 minutes, and sufficient to form a seal on the screen, by forming a cake or residue cake of sufficient thickness on the screen to form the seal. By "seal" as used herein is meant a closure formed on the screen or sieve by the cake or layer of the material comprising the alkaline bismuthide and molten lead, e.g. the debismuthizing dross, which is formed on the screen or sieve. Consequently when this "seal" cake or layer of such material is subjected to the action of a partial vacuum drawn on such material on the screen, the molten lead is drawn through pore channels of the cake or layer and through the screen or sieve openings.

Any suitable screen or sieve is utilizable in the method of this invention. We have attained excellent results in the method by employing a so-called de-watering screen constructed of parallel, narrowly spaced-apart rods of triangular shape in cross-section and having spacings or openings between the rods of about 0.005 inches in width. Such de-watering screen, although not having cross rods or woof rods or wires, is nevertheless included herein in the terms "screen" and "sieve". The de-watering screen is obtainable from Clawson and Associates, 6596 Highway No. 100, Nashville, Tenn. Any other suitable screen or sieve is utilizable in the method of this invention. The screen or sieve will usually have screen or sieve openings of size in the range of about 0.001 inch to about 0.01 1 inch. The screen or sieve utilized in this invention should, however, be a screen or sieve of substantial mechanical strength sufficient to enable the building and retention or maintenance thereon of the air-pervious residue cake of this invention while permitting a significant and acceptable flow rate of the molten lead filtrate through the screen openings (after passage of the molten lead through the pore channels of the porous residue cake). The screen or sieve should also be of substantial mechanical strength and of sufficient strength to support the molten lead and alkaline bismuthide charged to the upper surface of the screen. The screen or sieve can be fabricated of any material incapable of alloying with the lead and alkaline bismuthide and of the substantial mechanical strength mentioned immediately above. Exemplary of the materials of fabrication of the screen is steel, ceramic-coated metal, e.g. ceramic-coated steel, mineral wool, e.g. glass wool and rock wool, and ceramics such as, for example, porcelain.

The primary function of the screen herein is to build and maintain the pervious residue cake, and the screen is not the main or primary filtering medium although the screen may filter larger size alkaline bismuthide particles from the molten lead when present therein. The filtering medium in this invention, at least for most of the alkaline bismuthide particles, is the porous or pervious residue cake, inasmuch as only the pervious residue cake has sufficiently small openings or pore channels to filter out the minute or extremely small alkaline bismuthide solid particles, typically of size of about $1\mu$–$200\mu$, from the molten lead.

BRIEF DESCRIPTION OF THE DRAWINGS

FIG. 2 is en elevational view partially in section and partially broken away showing apparatus for producing the air-permeable means of concentrated bismuthide and also containing lead which is the feed material to the bismuth-recovery process of the present invention;

FIG. 3 is a section taken on line 3—3 of FIG. 2;

FIG. 4 is a section taken on line 4—4 of FIG. 2;

FIG. 5 is a fragmentary section through a screen assembly utilizable in the apparatus for producing the air-permeable mass of concentrated bismuthide and also containing lead; and FIG. 6 is a fragmentary section through another screen utilizable in the apparatus for producing the air-permeable mass of concentrated bismuthide and also containing lead.

DETAILED DESCRIPTION OF THE DRAWINGS

Figure 1:
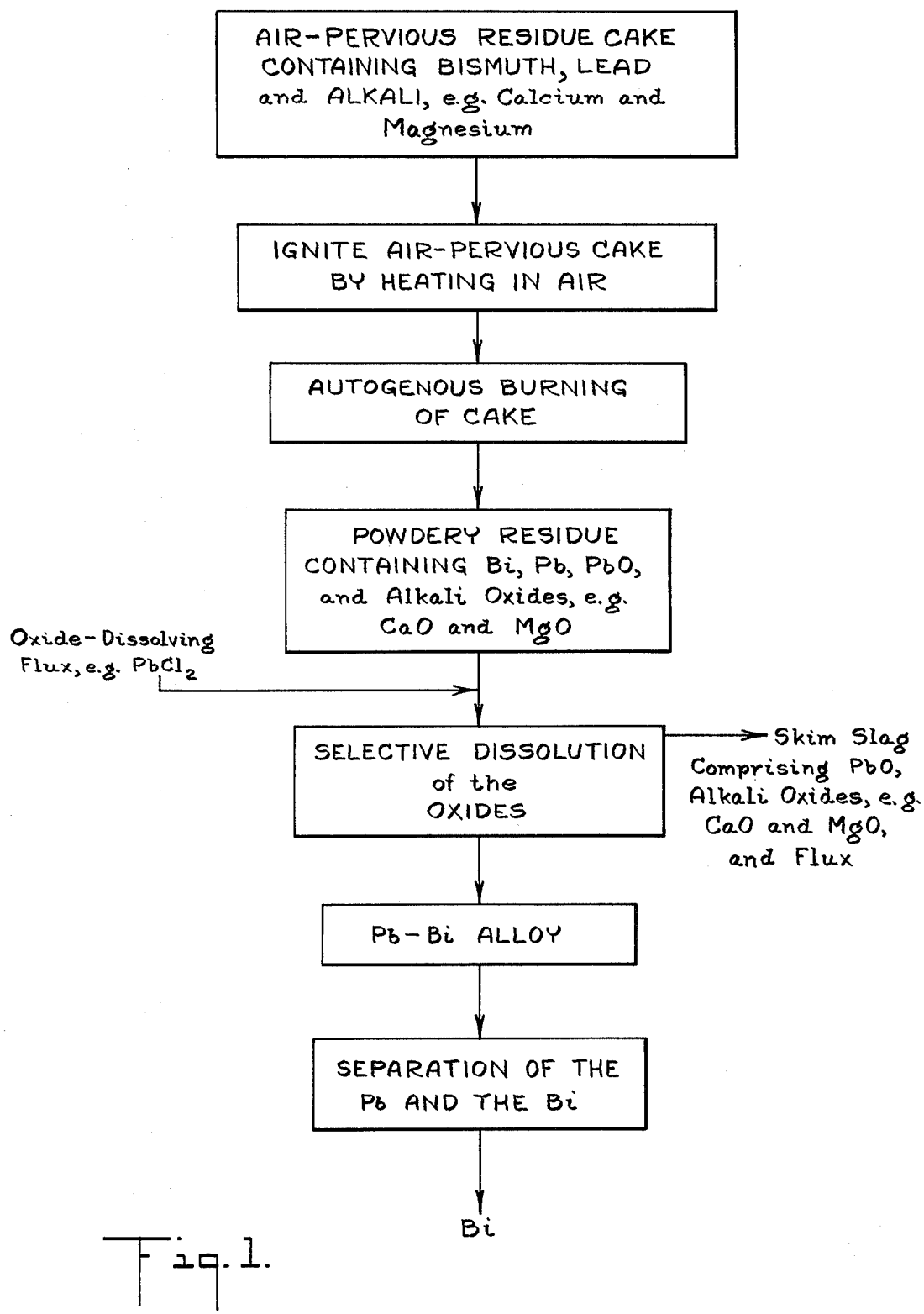
FIG. 1 is a schematic flow sheet of the process for recovery of bismuth in accordance with the present invention.

With reference to FIG. 1, an air-pervious or permeable cake containing alkaline bismuthide, e.g. calcium magnesium bismuthide ($CaMg_2Bi_2$), and lead is ignited by heating the cake in an open vessel in the presence of air to the ignition temperature of the alkaline bismuthide or higher, and typically in the range of about 850° F. to about 900° F. for the calcium magnesium bismuthide. Consequently the cake is ignited and burns autogenously to a powdery residue comprising metallic Bi, metallic lead, lead oxide, e.. PbO, and alkali oxides, for example alkaline earth metal oxides, e.g. CaO and MgO. Due to the porous, air permeable nature of the cake, air is able to pass into the interior of the cake to support the combustion therewithin so that all or substantially all of the cake is combusted to the powdery residue.

An oxide-dissolving flux, e.g. lead chloride, $PbCl_2$, is then admixed with the powdery residue from the combustion in a suitable vessel, and the lead oxide and alkali oxides are dissolved in the flux to the exclusion or substantial exclusion of the metallic bismuth and metallic lead. The oxide-dissolving flux can be admixed in solid or molten liquid state with the powdery residue. Such flux, if admixed in solid state with the powdery residue, is melted in the presence of the powdery residue to liquefy the flux by heating to a temperature above the melting point of the flux, which is a temperature above 501° C. when lead chloride is the flux. The molten flux containing the dissolved lead oxide and alkali oxides forms a separate layer of oxide-containing flux phase or slag phase on the surface of a liquid pool of the molten metallic phase containing the lead and bismuth as a Pb-Bi alloy.

The oxide-containing flux or slag phase is then separated from the Pb-Bi alloy, for instance by skimming the oxide-containing flux phase layer from the surface of the molten pool of Pb-Bi alloy.

When elemental Bi is the desired product, the Bi is separated from the Pb of the molten Pb-Bi alloy by treating the Pb-Bi alloy with chlorine gas. In carrying out this treatment, $Cl_2$ gas is supplied into a lower portion of a closed chamber, and the molten Pb-Bi alloy is showered or "rained" through the gas in conventional manner. The $Cl_2$ reacts selectively with the Pb to form $PbCl_2$ which separates as a separate phase layer on the surface of a pool of molten Bi. The $PbCl_2$ is skimmed of the surface of the pool of molten Bi. Alternatively, the Pb can be separated from the Bi by electrolysis, or by blowing the molten pool with free oxygen-containing gas, usually air, to selectively oxidize the Pb to form litharge. The litharge forms on the surface of the molten Bi, and is skimmed off the surface of the pool of molten Bi.

Referring now to FIG. 2 which shows apparatus for producing the gas-permeable, porous residue cake comprising the concentrated alkaline bismuthide and lead which is the feed material for the process of this invention, kettle setting 5 of refractory material receives kettle 6 for molten lead within recess or cavity 7 defined within setting 5. Kettle 6, which is fabricated of steel, is suspended within setting cavity 7 by means of lug 8 provided at the top portion of its wall, with lug 8 resting on the top edge surface of setting 5. Setting 5 and ladle 6 extend beneath the floor surface 9, as shown.

Filtration unit 10, also shown in FIG. 4, includes an upper-generally funnel-shaped portion or member 11 of steel integral with cylindrical member 12 of steel. Cylindrical member 12 has open ends and extends a considerable distance with kettle 6. Filtration unit 10 is lowered into kettle 6 by means of a hoist. Screen 13, also shown in FIGS. 3, 4 and 5, rests on spaced support bars 14 of steel. Screen 13 is part of a screen assembly, shown in FIG. 5, wherein screen 13 is mounted and secured between annular angle member 15 and annular member 16 by means of flat head screws 17. Twelve such screws 17 were employed and are threadably inserted through registering drilled and tapped apertures through annular member 16 and drilled apertures with counter bore bottom sections through angle member 15. Another screen utilizable herein with good results is screen 18 shown in FIG. 6 comprising spaced apart steel bars 19 having approximately 0.005 inch openings between adjacent bars. The bars 19 are triangular in cross section with the triangular bars being so positioned in the screen of the apparatus that the apex 20 of each bar was at the lower level surface and the flat base portion 21 of each triangular bar formed the top surface of the screen, such screen being obtained from Clawson Associates of Nashville, Tenn. Pipe manifold 22 is disposed about the upper portion of cylindrical member 12 of the filter unit and adjacent the bottom portion of generally funnel shaped member 11, and is equipped with a plurality of spaced apart gas burners 23 so arranged and disposed as to heat the metal wall of funnel-shaped member 11, and hence heat the interior of the funnel-shaped member 11 and the debismuthizing dross contained therewithin. Gusset plates 36 of steel, affixed to filtration unit 10, enable the filtration unit 10 to be mounted on the upper surface of lug 8 of kettle 6. Pipe 24 communicates at one end with a sealed or substantially sealed chamber 12 (when the concentrating method herein is being practised), with the point of communication of pipe 24 with chamber 25 being on that side of screen 13 opposite the side of screen 13 on which the debismuthizing dross is supplied and hereinafter disclosed in more detail, pipe 24 being connected to a suitable source of partial vacuum (not shown), such as a vacuum pump. Cylindrical member 12 of filtration unit 10 is partially immersed in a bath 27 of molten lead in kettle 6, the molten lead rising upwardly within open-ended cylindrical member 12 and, prior to and at start up of the concentrating herein, having the same or substantially the same level 28 within cylindrical member 12 as within annular space 29 defined between the wall of cylindrical member 12 and that of kettle 6. The molten lead pool 27 within the cylindrical member 12 in combination with the solid, continuous cylindrical sidewall 30 of cylindrical member 12 and the mass or layer of debismuthizing dross charged onto screen 13 form a closed or sealed chamber or compartment 25. Cover 31 is provided at the top portion of generally funnel-shaped member 11 and is received in radial enlargement cover seat 32, cover 31 being of ferrous metal and of slightly smaller diameter than cover seat 32. Seat 32 is formed at the top of funnel shaped member 11 by angle 33 of ferrous metal welded to the top portion of funnel-shaped member 11 and also supported by a plurality of spaced apart gusset plates 34. Lugs 35 at the lower portion of filtration unit 10 enable lifting and lowering of filtration unit 10 respectively out of and into kettle 12.

In operation of the apparatus of FIGS. 2–6 herein, with cover 31 removed from filtration unit 10, debismuthizing dross containing solid particles of alkaline bismuthide, e.g. calcium magnesium bismuthide ($CaMg_2Bi_2$), which was skimmed from the surface of the molten lead bath in the debismuthizing kettle, is charged batchwise into funnel-shaped member 11 of filtration unit 10 and onto screen 13. Burners 23 are preferably turned on prior to charging the debismuthizing dross onto screen 13, to heat screen 13 and the funnel-shaped member 11 sufficiently to prevent cooling solidification of the molten lead in the debismuthizing dross. Cover 31 is then put in place in seat 32, and the vacuum pump started and a partial vacuum of typically 27–28 inches drawn through pipe 24 on the debismuthizing dross on screen 13. The molten lead is drawn, due to the gentle influence or "pull" of the partial vacuum, through the open and unobstructed pore channels of the filter cake or residue cake comprising the alkaline bismuthide, e.g. calcium magnesium bismuthide, solid particles, which forms on the screen 13. Such filter cake or residue cake does most, if not all or substantially all, of the filtering of the alkaline bismuthide solid particles or crystals from the molten lead, due to the fact that the diameter of the pore channels of such cake is sufficiently small to prevent at least a major portion of the alkaline bismuthide particles from passing therethrough while being sufficiently large to allow the molten lead to pass therethrough. The primary function of screen 13 is to serve as a means and support for enabling the building and the retention thereon of the filter cake or residue cake. Molten lead arises upwardly within cylindrical member 12 from molten lead pool 27 in the kettle 6 during the partial vacuum application from an original level exemplified by level 28 to a new level therewithin exemplified by level 37, and consequently the molten lead level falls in annular space from an original level exemplified by level 28 to a new level exemplified by level 38. The molten lead, after leaving the residue cake, passes through the openings of screen 13 and drops downwardly into the pool of molten lead within cylindrical member 12.

The molten lead is drawn through the pore channels of the residue cake herein without any significant physical compression of the residue cake. This is of critical importance for the reason an air-pervious cake of concentrated alkaline bismuthide is thereby produced, which enables the recovery of elemental bismuth from the cake by the process of this invention involving ignition and combustion of the cake autogenously by heating in air to liberate elemental bismuth. The pervious or permeable cake enables the atmospheric air to diffuse into the interior of the cake during the heating which is of critical importance to enable the liberation or recovery of elemental bismuth from the interior of the cake. On the contrary, in the prior art pressing of the debismuthizing dross between metal plates, there occurs significant compression of the cake with consequent collapse and/or blockage of the pore channels thereof. The result is a non-air pervious or non-air permeable cake, or such a cake of relatively low permeability to air, which is unsatisfactory for the autogenous ignition and combustion process herein for recovery of the elemental bismuth.

DESCRIPTION OF THE PREFERRED EMBODIMENTS

The preferred flux for use herein is lead chloride ($PbCl_2$).

Treatment and reaction with $Cl_2$ gas is the preferred procedure for separating the Bi from the Pb-Bi alloy. The $PbCl_2$ which is formed can be returned for use as the flux.

In forming the air-pervious residue cake, the partial vacuum that is drawn on the alkaline bismuthide-containing molten lead on the sieve to draw the molten lead through the residue cake is equivalent to a partial vacuum measurement value preferably in the range of about 25 to about 28 inches Hg.

The alkaline bismuthide-containing molten lead is preferably at a temperature in the range of about 750° F. to about 850° F. during the partial vacuum-filtering concentrating to form the air pervious residue cake.

The following examples further illustrate the invention. Percentages set forth in the examples are by weight.

EXAMPLE 1

Fifteen lbs of the air-pervious residue cake of concentrated bismuthide content obtained by the procedure hereinafter described in this Example 1 and containing 17.6% Bi, 1.7% Ca, 2.0% Mg and about 78.7% Pb was charged as pieces of such cake to an iron kettle. The cake pieces were heated in the kettle, which was open to the atmosphere, to 850° F. to spontaneously ignite the cake pieces. The ignited pieces of cake was allowed to burn autogenously to oxidize the calcium and the magnesium of the $CaMg_2Bi_2$ present in the cake to CaO and MgO and a portion of the lead also present in the cake to PbO without oxidizing the bismuth of the CaM₂Bi and to form a yellowish, powdery cake. The ignition of the cake pieces started at a point on each piece of cake and proceeded to cross the entire piece at a rate of about 2-3 inches per minute. The cake pieces glowed a bright, cherry red during this flameless combustion, and no visible flames and very little fuming was observed. The yellowish, powdery residue from the burning and containing the CaO, MgO, PbO, Bi and Pb was then added to 15 lbs of molten $PbCl_2$, whereby the CaO, MgO and PbO dissolved in the molten $PbCl_2$ flux, freeing the elemental Bi and remaining metallic Pb which alloyed together. A slag layer containing the $PbCl_2$ and the dissolved CaO, MgO and PbO formed on the surface of a molten pool of Pb-Bi alloy, and 22 lbs of such slag was skimmed from the surface of the Pb-Bi alloy pool. 6.3 lbs of Pb-Bi alloy containing 41.2% Bi was obtained. The molten Pb-Bi alloy is then showered or "rained" as molten droplets of such alloy through $Cl_2$ gas in a closed chamber, the $Cl_2$ gas being introduced into the chamber in the lower portion thereof and the molten Bi-Pb alloy introduced into the chamber in an upper portion thereof. The $Cl_2$ reacts selectively with the Pb of the molten Bi-Pb droplets to form $PbCl_2$ which separates out as a separate phase layer on the surface of a pool of molten Bi. The $PbCl_2$ is skimmed from the surface of the molten Bi pool.

The air-pervious residue cake of concentrated bismuthide content and also containing lead was obtained by the following procedure: 208 lbs of debismuthizing dross containing calcium magnesium bismuthide ($CaMg_2Bi_2$) and lead was melted in a kettle at 825° F. The dross had the following analysis:

|  | By Weight |
|---|---|
| Bi | 8.5 % |
| Ca | 0.85 % |
| Mg | 1.33 % |
| Pb | Substantially the balance |

The dross had the consistency of a wet mud at this temperature of 825° F., and was composed of small crystals of the calcium magnesium bismuthide dispersed in the molten lead which also contained a small amount of Sb and Zn. Such molten dross was ladled onto the 100 mesh stainless steel screen of the preheated filtration unit shown in FIGS. 2-5 of the drawings and previously disclosed herein in detail without any vacuum being drawn on the molten dross. The filtration unit consisted of a pipe 14 inches in diameter and 30 inches in length welded to a funnel-shaped top. The funnel-shaped top was 14 inches in length, had a diameter of 14 inches at the place of welding to the pipe and a diameter of 20 inches at its top portion, and had two lifting lugs at opposite sides of its top edge. A flange was inserted between the pipe and the funnel-shaped top upon which the 100 mesh stainless steel screen was placed. The lower portion of the pipe was inserted into a pool of 300 lbs of molten lead in the bottom of a 500 lb lead kettle, and the lead pool then permitted to solidify thereby providing a seal for the filtration unit during evacuation. The upper portion of the pipe was connected to a vacuum pump by a rubber hose. The funnel-shaped top was pre-heated to a temperature of 825° F. by two semi-circular gas-air burners inserted about the intermediate portion thereof from opposite sides of this funnel-shaped top. The molten dross was held on the stainless steel screen for a period of about 1 minute without any partial vacuum being drawn on the dross from below the screen, for the purpose of forming a seal by means of forming a suitable cake comprising crystals of the alkaline bismuthide on the screen. A partial vacuum of 28 inches Hg was then drawn on the cake from beneath the screen by means of the vacuum pump, whereby the molten lead on and in the cake was drawn through the pore channels of the residue cake without any major compression of the residue cake and without any significant blockage of flow by constriction or collapse of the walls forming the pore channels of the residue cake, under the influence of the partial vacuum, and the alkaline bismuthide crystals dispersed in the molten lead were separated from the molten lead and retained by the cake. After 1 hour, the partial vacuum was released, the heat at the funnel-shaped top of the unit was turned off, the lead seal in the kettle melted, and the filter unit was lifted from the molten lead in the kettle with the aid of a hoist and the lifting lugs. The residue cake was then removed from the screen simply by turning a filter unit upside down. The residue cake and the filtrate were separately carefully weighed, and samples obtained for analysis. The residue cake was analyzed by cutting it into quarter sections, and then drilling samples from locations on each quarter section. The residue cake, which had a total weight of 125 lbs, had the following analysis (percentages being by weight):

| Bi | 17.6 % |
|---|---|
| Ca | 1.7 % |
| Mg | 2.0 % |
| Pb | Substantially the balance |

EXAMPLE 2

The procedures of Example 1 was repeated except that 13.6 lbs of the air-pervious residue cake was spontaneously ignited and burned in the kettle in this Example 2, and such residue cake contained 10.0% Bi, 1.0% Ca, 1.2% Mg and about 87.8% Pb. Further, 14.5 lbs of $PbCl_2$ was utilized in this Example 2 to selectively dissolve the CaO, MgO and PbO in the molten $PbCl_2$, thereby freeing the elemental Bi and metallic Pb which alloyed together 27 lbs of slag containing $PbCl_2$, CaO, MgO and PbO was skimmed from the surface of the Pb-Bi alloy molten pool, and 4.8 lbs of Pb-Bi alloy containing 28% Bi remained.

Two-hundred and fourteen pounds of debismuthizing dross containing calcium magnesium bismuthide ($CaMg_2Bi_2$) and analyzing 4.5% Bi was subjected to the filtering procedure under vacuum in this Example 2 to provide the air-pervious residue cake of concentrated bismuthide content, which was the feed material for the spontaneous ignition and combustion steps of this Example 2.

What is claimed is:

1. A process for the recovery of bismuth from an alkaline bismuthide -and lead-containing material which comprises heating a free oxygen-containing gas-permeable mass of the alkaline bismuthide -and lead-containing material in the presence of a free oxygen-containing gas to at least the ignition temperature of said gas-permeable mass to ignite said permeable mass, burning said permeable solid mass to oxidize the alkali and a portion of the lead to the substantial exclusion of the bismuth and form a particulate residue comprising elemental bismuth, elemental lead, lead oxide and alkali oxide, selectively dissolving the alkali oxide in a flux, the flux and alkali oxide dissolved therein being readily separable from a resulting, molten lead-bismuth alloy, and separating the flux with alkali oxide dissolved therein from the molten lead-bismuth alloy.

2. The process of claim 1 wherein the lead is separated from the bismuth of the lead-bismuth alloy.

3. The process of claim 2 wherein the lead is separated from the bismuth by treating the molten lead-bismuth alloy melt with chlorine, the chlorine reacting with the lead to the substantial exclusion of the bismuth to form lead chloride, the thus-formed lead chloride separating as a separate phase from the molten bismuth, and separating the lead chloride-containing phase from the molten bismuth.

4. The process of claim 1 wherein the flux is lead chloride.

5. The process of claim 3 wherein the separated lead chloride is returned to the process as flux.

6. The process of claim 1 wherein the gas-permeable, mass of concentrated alkaline bismuthide and also containing lead is obtained by a method comprising supplying a material comprising the alkaline bismuthide and molten lead onto a heat-resistant screen of substantial mechanical strength, the screen having openings of such size as to enable the retention thereon of a pervious residue cake comprising the alkaline bismuthide and lead, subjecting the material on the screen to the influence of a partial vacuum drawn from the opposite side of the screen from the material thereon comprising the alkaline bismuthide and lead, drawing the molten lead through pore channels of the residue cake comprising the alkaline bismuthide and through the screen opening under the influence of the partial vacuum without any significant physical compression of the residue cake, and separating the resulting air-pervious, porous residue cake from the screen.

7. The process of claim 6 wherein a closed chamber is provided on that side of the screen opposite the side thereof having the material comprising the alkaline bismuthide and molten lead thereon, the partial vacuum being drawn on the material comprising alkaline bismuthide and molten lead on the screen through the closed chamber, the material comprising the alkaline bismuthide and molten lead on the screen forming one closure barrier of the closed chamber.

8. The process of claim 6 wherein the material comprising the alkaline bismuthide and lead is a debismuthizing dross.

* * * * *

UNITED STATES PATENT AND TRADEMARK OFFICE
CERTIFICATE OF CORRECTION

PATENT NO. : 4,039,323                    Page 1 of 2
DATED      : August 2, 1977
INVENTOR(S): Carl Richard DiMartini and William Lafayette Scott It is certified that error appears in the above-identified patent and that said Letters Patent are hereby corrected as shown below:

Title page, second column, line 24, "8 Claims" should read --14 Claims--. Column 1, line 22, "bismuhide" should read --bismuthide--; line 34, "penetration" should read --preparation--; line 63, "thd" should read --the--. Column 2, line 46, "the" should read --be--. Column 4, line 60, after "0.01" and before "inch" delete "1". Column 6, line 45, "with" should read --within--. Column 8, line 2, change "arises" to --rises--. Column 9, line 2, "CaM$_2$Bi" should read --CaMg$_2$Bi$_2$--. Column 10, line 46, after "together" and before "27" insert a period. Claims 9, 10, 11, 12, 13 and 14 should follow claim 8 and read as follows:

9. The process of claim 1 wherein the alkaline bismuthide is calcium magnesium bismuthide.

10. The process of claim 2 wherein the alkaline bismuthide is calcium magnesium bismuthide.

11. The process of claim 8 wherein the alkaline bismuthide is calcium magnesium bismuthide.

UNITED STATES PATENT AND TRADEMARK OFFICE
CERTIFICATE OF CORRECTION

PATENT NO. : 4,039,323

DATED : August 2, 1977

INVENTOR(S) : Carl Richard DiMartini and William Lafayette Scott

It is certified that error appears in the above-identified patent and that said Letters Patent are hereby corrected as shown below:

12. The process of claim 1 wherein the free oxygen-containing gas is air.

13. The process of claim 2 wherein the free oxygen-containing gas is air.

14. The process of claim 8 wherein the free oxygen-containing gas is air.

Signed and Sealed this

Eighth Day of August 1978

[SEAL]

Attest:

RUTH C. MASON
Attesting Officer

DONALD W. BANNER
Commissioner of Patents and Trademarks